(12) United States Patent
No et al.

(10) Patent No.: US 6,747,689 B1
(45) Date of Patent: Jun. 8, 2004

(54) METHOD OF OPERATING A MULTIPLE COMPONENT ELECTRONIC IMAGING SYSTEM

(75) Inventors: Young No, Pittsford, NY (US); Timothy F. Donahue, Mendon, NY (US); William C. Tate, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/353,735

(22) Filed: Jul. 14, 1999

Related U.S. Application Data

(63) Continuation-in-part of application No. 08/956,989, filed on Oct. 23, 1997, and a continuation-in-part of application No. 09/054,770, filed on Apr. 3, 1998.

(51) Int. Cl.[7] .............................................. H04N 5/225
(52) U.S. Cl. ................... 348/207.2; 348/211.3
(58) Field of Search .................... 348/207.2, 207.11, 348/207.1, 211.14, 211.1, 211.11, 231.9, 231.8, 231.7, 231.99, 211.3

(56) References Cited

U.S. PATENT DOCUMENTS

| | | | |
|---|---|---|---|
| 4,281,909 A | 8/1981 | Ishibashi et al. | |
| 4,803,554 A | 2/1989 | Pape | |
| 4,887,161 A | 12/1989 | Watanabe et al. | |
| 4,914,746 A | 4/1990 | Nishi et al. | |
| 4,937,676 A | 6/1990 | Finelli et al. | |
| 5,231,501 A | 7/1993 | Sakai | |
| 5,488,558 A | 1/1996 | Ohki | |
| 5,493,332 A | 2/1996 | Dalton et al. | |
| 5,506,617 A | 4/1996 | Parulski et al. | |
| 5,696,850 A | 12/1997 | Parulski et al. | |
| 5,790,193 A | 8/1998 | Ohmori | |
| 5,796,428 A | 8/1998 | Matsumoto et al. | |
| 6,118,929 A | 9/2000 | Kawamura et al. | |
| 6,145,951 A | 11/2000 | Hayasaki et al. | |
| 6,208,376 B1 * | 3/2001 | Tanaka et al. | 348/211.3 |
| 6,256,063 B1 | 7/2001 | Saito et al. | |
| 6,295,082 B1 | 9/2001 | Dowdy et al. | |
| 6,300,976 B1 * | 10/2001 | Fukuoka | 348/231.99 |
| 6,538,663 B2 * | 3/2003 | Kamei | 345/635 |
| 2001/0039587 A1 * | 11/2001 | Uhler et al. | 709/229 |
| 2003/0030729 A1 * | 2/2003 | Prentice et al. | 348/207.1 |

FOREIGN PATENT DOCUMENTS

| | | |
|---|---|---|
| EP | 0 382 044 A | 8/1990 |
| EP | 0 675 648 A2 | 10/1995 |
| EP | 0 912 035 A2 | 4/1999 |

* cited by examiner

*Primary Examiner*—Aung Moe
(74) *Attorney, Agent, or Firm*—Norman Rushefsky

(57) ABSTRACT

A method of operating an electronic imaging system (20) as a distributed processor network is provided for a system that includes multiple imaging components such as digital cameras (22), printers (34), etc., wherein each component is connected to an intelligence module (24–36) having a microcontroller (58) and memory (62). In the method, the intelligence modules (24–36) are interconnected by way of a data interface (28–37) to form a system network. Next, different image processing steps are assigned to different ones of the intelligence modules (24–36). Image data entered and stored within the imaging system (20) is divided into a plurality of data groups, each of which preferably corresponds to a portion of an image. Finally, the data groups are serially entered through each of the intelligence modules (24–36) such that a specific sequence of image processing steps are conducted on each data group until the processing of a specific image is completed. The method efficiently utilizes all the microcontroller capability present in the network intelligence modules (24–36), thereby minimizing the processing time required to render images.

18 Claims, 7 Drawing Sheets

METHOD OF OPERATING A MULTIPLE COMPONENT ELECTRONIC IMAGING SYSTEM

CROSS REFERENCE TO RELATED APPLICATIONS

This application is a continuation-in-part of application Ser. No. 08/956,989, filed Oct. 23, 1997, and entitled System and Method for Using a Single Intelligence Circuit in Both a Digital Camera and Printer and a continuation-in-part of application Ser. No. 09/054,770, filed Apr. 3, 1998, and entitled System and Method for Using a Single Intelligence Circuit.

FIELD OF THE INVENTION

This invention generally relates to a method of operating a multiple component electronic imaging system as a distributed processor network system to maximize the processing speed and efficiency of the imaging system.

BACKGROUND OF THE INVENTION

Electronic imaging components, such as digital cameras, scanners, printers, etc. are conventionally controlled by a dedicated intelligence circuit having its own user interface that is normally mechanically integrated into the housing of the component. As the microcontroller, memory, and user interface (UI) forming the intelligence circuit is often one of the most expensive parts of the camera, printer, or other imaging component, the Eastman Kodak Company has developed systems and methods for using a single modular intelligence circuit to operate a plurality of imaging components. Such systems are disclosed and claimed in U.S. patent application Ser. Nos. 08/956,989 and 09/054,770, filed Oct. 23, 1997 and Apr. 3, 1998, respectively, both of which are assigned to the Eastman Kodak Company.

In each of these systems, a single compact intelligence module is detachably connected to any one of a digital camera, a film scanner, printer, digital photo album, digital projector, etc. in order to share images and to operate the same. The intelligence module has its own user interface which includes an LCD screen that is used to control the particular imaging component that the module is connected to. The design takes advantage of the observation that consumers rarely operate more than one particular imaging component at one time. For example, when a consumer is capturing images via a digital camera, the consumer's photo rendering component (which may be a color printer, a video screen, or an LCD display) is typically not in use. This observation inspired the personnel at Eastman Kodak Company to conceive of a line of relatively "dumb" digital cameras, printers, and other imaging components, each of which may be operated by a compact and manually transferable intelligence module which is detachably connectable to a mating socket present in each one of the imaging components. Such a system not only lowers the manufacturing costs of the imaging system as a whole, but in certain ways actually enhances the operational reliability and functionality of each component.

While such a "shared intelligence" system represents a major advance in the art, the inventors have noticed that the technique of manually transferring a portable intelligence module to one imaging component at a time (and hence forming what is known as a "sneaker-net" between the components) is appealing to those users interested in lowest cost and who may be wary of high technology devices typical of electronic cabled components. Some users, however, may tire of the need to move the intelligence module from one device to another (particularly as the number of imaging components expands beyond a digital camera and printer) and are comfortable with a higher level of technology at additional cost.

For example, if a system operator owned only a digital camera and a printer, the resulting "sneaker-net" work flow could be easily executed by merely detachably connecting the intelligence module to the camera in order to capture and store images, and then detaching the module from the camera and connecting it into the printer to render hard copies of the captured images.

However, a more complex work flow is created if the system operator owns additional components, as illustrated in FIGS. 1A and 1B. Here, the operator owns a system 1 that includes a digital camera 2 that is operative when an intelligence module 4 is electrically and mechanically connected to it via sockets 6. He also owns an archiving station designed to store a large number of digital images, an APS color negative film scanner 10 designed to capture images from previously exposed and processed film, and a printer 12, each of which is operative when connected to the single intelligence module 4. Using these system components, if the operator wishes to capture several images with the digital camera 2, add these images to others captured with the scanner 10, store all of the images in the archiving station 8, and print all of them on the printer 12, the intelligence module would have to be moved three times to complete the work flow, as indicated in FIG. 1B.

In a second example illustrated in FIG. 2, the system operator might own a system 14 that includes a view/edit station 15 for modifying and/or viewing captured images, an archiving station 16, and a printer 18 in addition to the digital camera. If the operator wanted to retrieve images from the archiver 16, edit them on the view/edit station 15, store the modified images back on the archiver 16, and print these images out on the printer 18, the intelligence module would again have to be moved three times to complete the work flow.

Clearly, there is a need for an electronic imaging system which maintains at least some of the economies and advantages of the previously described "shared intelligence" systems, but which eliminates the need for multiple manual transfers of the intelligence module to complete a desired work flow. Ideally, such a system could be easily implemented using a combination of commercially available components and software packages with some original components and software so as to maximize the capability of the system while minimizing the cost of development and manufacture. Finally, it would be desirable if such a system were operated in a way that reduced the time necessary to execute a particular work flow.

SUMMARY OF THE INVENTION

Generally speaking, the invention is a method of operating an electronic imaging system as a distributed processor network that overcomes the shortcomings associated with the prior art. The method is particularly adapted for use with an electronic imaging system that includes a plurality of imaging components, each of which is connected to an intelligence module having a microcontroller and memory. In the method of the invention, the intelligence modules of each of the imaging components are interconnected with a data interface, such as a high-data throughput cable, in order to form a system network. Different processing steps are then assigned to different ones of the intelligence modules. Next, image data entered and stored within the system is divided into a plurality of data groups which may correspond to different portions of a single image. The data groups are then serially entered through each of the intelligence modules until a specific chain of processing steps are completed on each particular data group. With the exception of the beginning and end of the method, the microcontroller and memory of each of the various microcontrollers is continuously and simultaneously used thereby greatly improving efficiency while minimizing the processing time required to render an image.

In the preferred method, one of the modules has a user interface, and the network formed by the interconnection of the intelligence modules is controlled by the module having the user interface. Additionally, each of the imaging components preferably includes a memory circuit that stores operating instructions for its respective component. The controlling module may have software for downloading and executing the operating instructions of each of the various imaging components, and the method of the invention may further comprise the step of downloading the operating instructions from each of the memory circuits into the controlling module prior to the processing of the image data. The downloading software may include Java™, Jini™, and networking software.

The operating instructions contained within the memory circuits of each of the imaging components preferably includes user interface software for its respective imaging components which, when transferred to the controlling module, allows the user interface of the controlling module to control the particular imaging component. The operating instructions stored in each of the memory circuits preferably also includes specific firm ware for the imaging component associated with the memory circuit which, when downloaded into the controlling module, allows the controlling module to control specific components of the imaging component (such as aperture adjustment and focusing of a camera, etc.). Finally, the operating instructions stored in each of the memory circuits may include characterization data for allowing the intelligence module connected to the particular imaging component to convert image data received from another imaging component to properly format the processed image data. Examples of such characterization data may include device dependent parametric information such as the number of pixels that the device operates in and the particular color format that the image is stored within.

DETAILED DESCRIPTION OF THE INVENTION

Figure 1A:
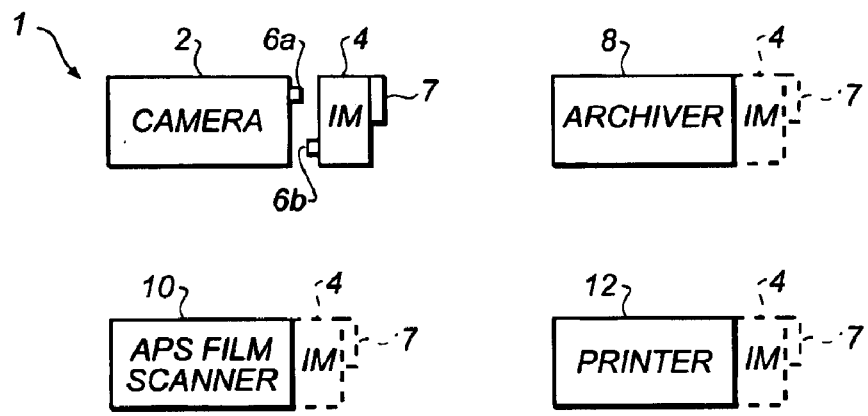
FIG. 1A is a schematic diagram of a four-component imaging system, illustrating the relationship between each of the imaging components and an intelligence module having a control interface.
Figure 1B:
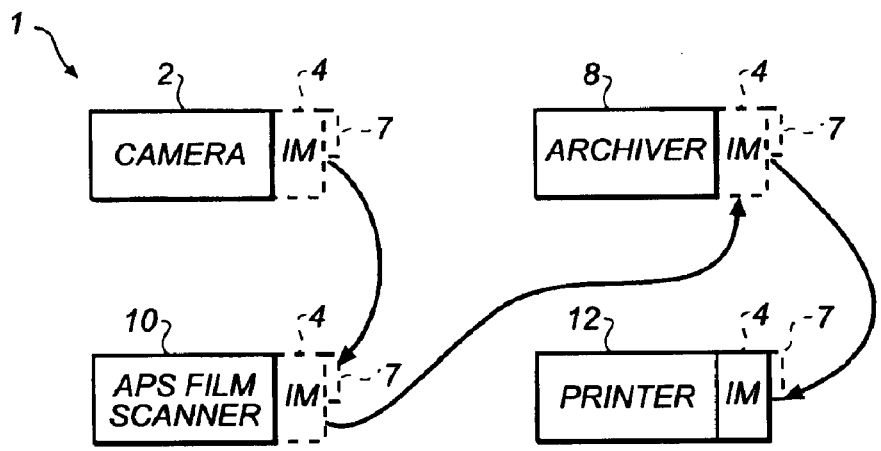
FIG. 1B is a schematic representation of how the intelligence module of the system illustrated in FIG. 1A must be moved from component-to-component via a "sneaker-net" in order to implement a work flow.
Figure 2:
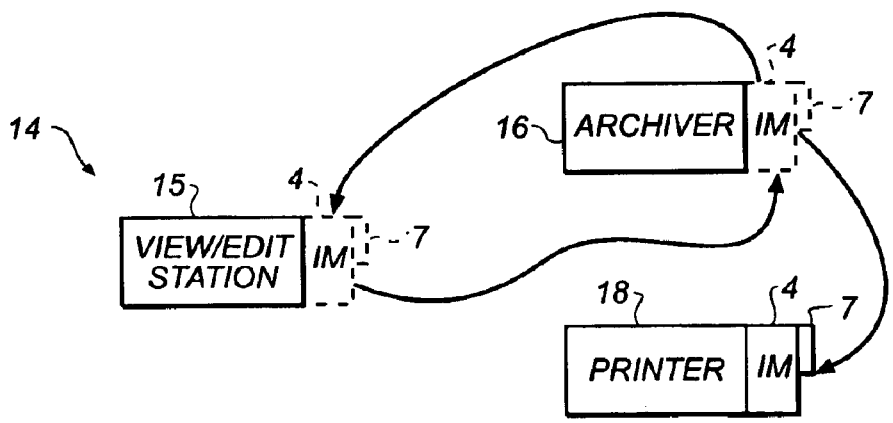
FIG. 2 is a schematic representation of a different multiple component imaging system illustrating again how the intelligence module must be manually transferred from component-to-component to complete a particular work flow.
Figure 3:
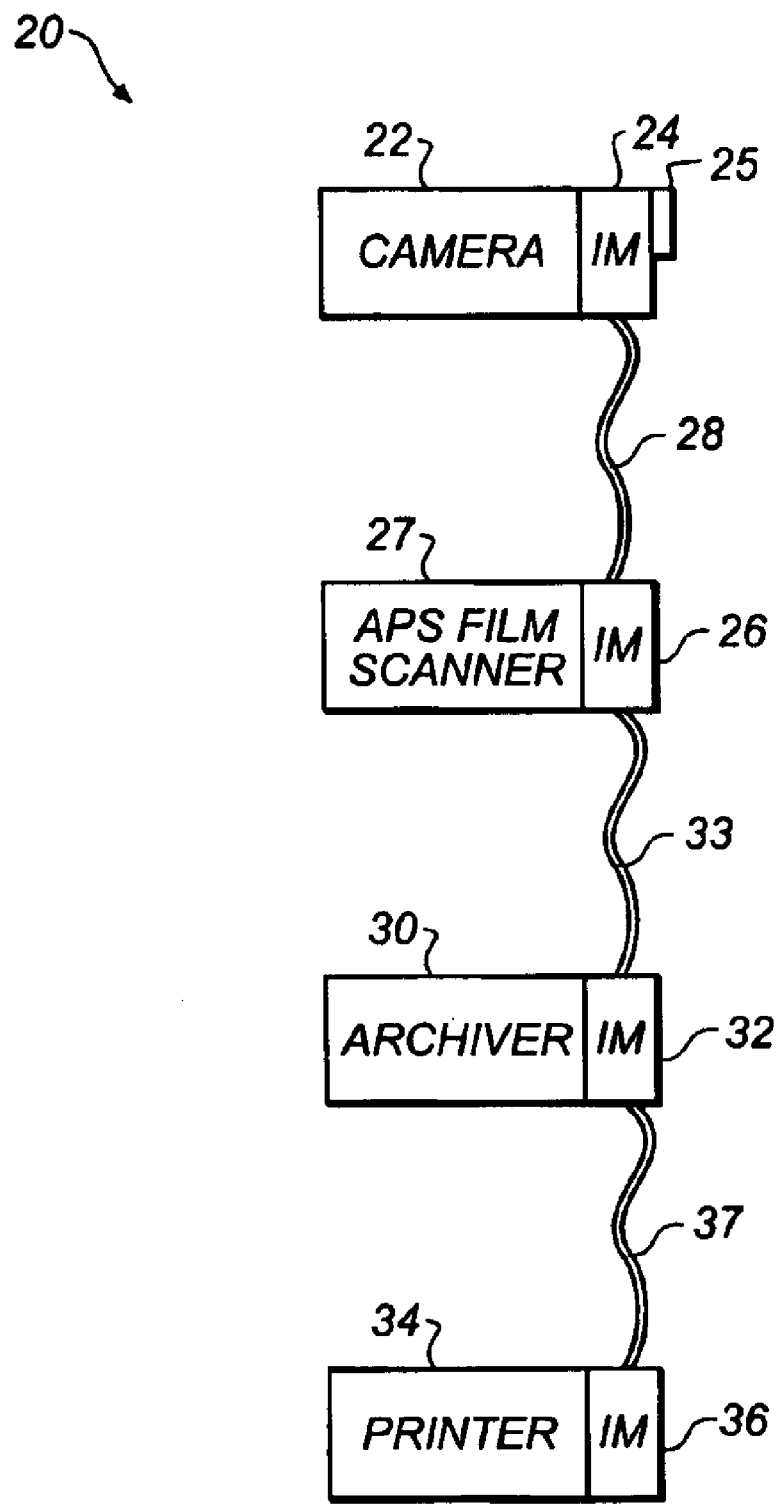
FIG. 3 is an imaging system of the invention, wherein one of the components includes an intelligence module having a control interface while the balance of components each include a control module without such an interface.

With reference now to FIG. 3, wherein like reference numerals indicate like components throughout all of the several Figures, an imaging system 20 that embodies the invention may include, for example, a digital camera 22 having a detachably connectable intelligence module 24 including a user interface 25. As described in more detail hereinafter, the user interface 25 is typically formed from an LCD screen in combination with push button controls for scrolling, displaying, editing, transferring, and deleting selected images. The intelligence module 24 of the camera 22 is connected to the intelligence module 26 of an APS film scanner 27 via an intelligence conducting cable 28. In the preferred embodiment, cable 28 preferably conforms to the specifications of a high-speed, low-cost networking standard such as IEEE 1394 (FireWire). Cable 28 is detachably connectable to intelligence modules 24,26 by way of jacks or other standard connectors. In the preferred embodiment, the camera 22 may be, for example, a Model DC120 or DC210 manufactured by Eastman Kodak Company located in Rochester, N.Y., modified so as to be "lobotomized" of the intelligence circuit that is normally present in this device. Similarly, the APS film scanner 27 may be a "snap-shot photo scanner" likewise manufactured in lobotomized form by the Eastman Kodak Company.

The imaging system 20 further includes an archiver 30 also having an intelligence module 32 which is connected to the intelligence module 26 of the film scanner 27 by segment 33 of the same intelligence-conducting cable as previously-described cable 28. The archiver 30 is a device capable of storing a large number of images. To this end, archiver 30 includes a slot for the receipt of a recordable optical disc (not shown) that stores image data. Finally, the imaging system 20 includes a printer 34 for rendering hard copies of selected images. Like the film scanner 27 and archiver 30, the printer 34 includes an intelligence module 36 which, while not including a user interface 25, does include the processor, memory, and software necessary to operate the printer 34. In the preferred embodiment, printer 34 may be, for example, a Model No. DS8650 thermal printer manufactured by the aforementioned Eastman Kodak Company, appropriately "lobotomized" of the microcontroller and memory that is normally present within this device whose function is obviated by the presence of detachably connectable intelligence module 36. Module 36 is connected to the intelligence module 32 of the archiver 30 via another segment of intelligence conducting cable 37.

Figure 4B:
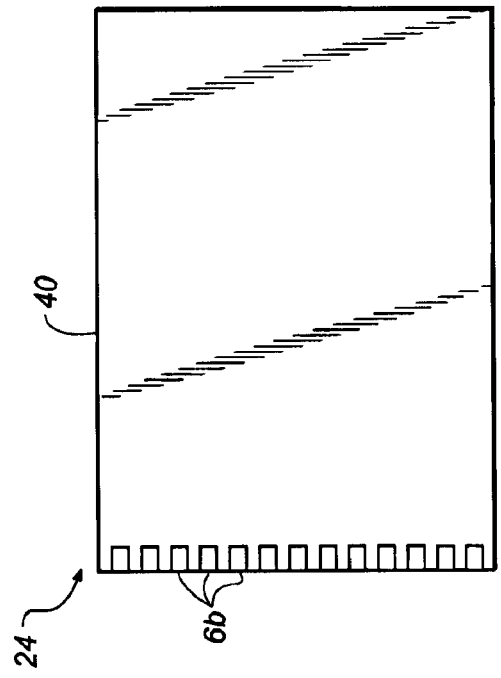
FIGS. 4A, 4B, 4C, and 4D are a front, top, back, and side views of an intelligence module having a user interface.
Figure 4D:
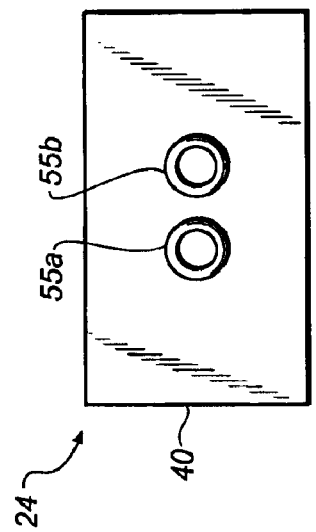
Figure 4A:
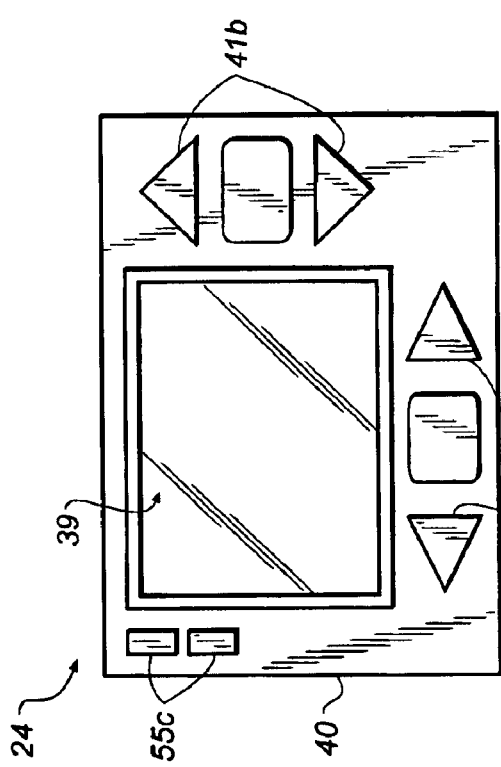
Figure 4C:
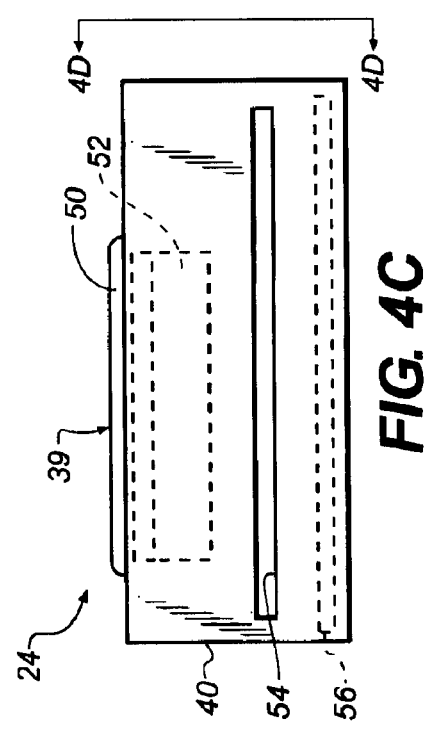

FIGS. 4A–4D illustrate more concretely the various mechanical features of an intelligence module 24 having a user interface 25. The user interface 25 includes an image display 39 mounted in a rectangular housing 40 in combination with two pairs of control buttons 41a,b. The image display 39 includes an LCD screen 50. In the preferred embodiment, the LCD screen 50 is a low temperature, polysilicon-type screen, as such screens can be made with an overall thickness of approximately 1 millimeter and therefore not significantly contribute to the overall thickness of the rectangular housing 40. Screen 50 is illuminated via a back light panel 52 in a manner well known in the art. An interface connector assembly 6b is provided along the edge of the back face of the module housing 40, as is shown in FIG. 4B. Finally, a flash card socket 54 is provided along the top surface of the rectangular housing 40 of the module 24 for receipt of a flash memory card, as shown in FIG. 4C. Push buttons 41a,b allow the system operator to actuate the module 24 and to display on the LCD screen 50 a desired set of control choices on the screen of the image display 39, a real time image on the screen of the image display 39, or to scroll backwards and forwards with respect to a set of images reserved in the memory of the module 24. The module 24 further includes an input/output jack socket 55a,b (shown in FIG. 4D) in one of its side walls for receiving the jack connector of a segment of the previously-described intelligence carrying cables 28, 33, and 37. A pair of LED's 55c are provided next to the image display 39 for indicating when the intelligence module 24 is turned on. It should be noted that the exterior structure of any of the intelligence modules 26, 32, and 36 that do not include a user interface is exactly the same as that described with respect to module 24 except that such modules do not include the image display 39, control buttons 41a,b, or flash card socket 54.

The interior of each of the intelligence modules 24, 26, 32, and 36 includes a printed circuit board assembly 56 upon which a microcontroller 58 is mounted. Preferably, the microcontroller 58 is one of the commercially available family of reduced instruction set computers (known as RISC-type microcontrollers) that are relatively fast, math intensive, and application-specific. An example of such microcontrollers includes the Model 821 Power PC manufactured by Motorola Corporation located in Phoenix, Ariz. Such processors are fully capable of rapidly implementing the JPEG still image compression, decompression, and processing algorithms used in both image capturing and image rendering components.

The printed board assembly 56 further includes flash memory 62 for storing an initialization and operating program for the microcontroller 58. Generally, the program is started whenever the circuit on the board assembly 56 receives electrical power as a result of the module 24 being plugged into an imaging component. The software stored within the flash memory 62 of any of the intelligence modules 24, 26, 32, or 36 all include Java™ VM software sold by Sun Microsystems, Inc., located in Mountain View, Calif. for executing the operating program stored within each of the imaging components in a common Java™ byte code format. Additionally, the flash memory 62 of a controlling module 24 also includes Jini™ support software likewise available from Sun Microsystems, Inc., so that the controlling module 24 can communicate with and coordinate processing activities between all of the other intelligence modules 26, 32, and 36 of the system 20. A more detailed description of both how this is done, as well as the software architecture contained with the flash memory 62, is provided hereinafter.

The flash memory 62 included on circuit board assembly 56 preferably has at least a 16 megabyte capacity. The flash memory 62 is a non-volatile memory which, in addition to operating programs, may be used by the microcontroller 58 to store image data files when the intelligence module 56 is not connected to a power source. Advantageously, the stored image data remains in the flash memory 62 after the module is detached from a power source. A 16 megabyte Flash memory can store up to 5 megapixel images or up to 50 JPEG compressed images. Flash memories 62 having the requisite capacities are commercially available from any one of a number of vendors, including a AM29F200 IC manufactured by the AMD Corporation located in Sunnyvale, Calif. If such a component were used, eight 2 megabyte ICs should be installed on the board assembly 56.

The printed circuit board assembly 56 further includes a Dynamic Random Access Memory 64 or DRAM. Preferably the DRAM 64 should have at least a 20 megabyte capacity in order to store any working image and data executable program downloaded from the particular imaging component that the module 56 is plugged into. Examples of commercially available integrated circuits which can be used as the DRAM 64 includes the Model MCM51LXXX DRAM manufactured by Motorola, or one of the series of AMD29C600 DRAMs manufactured by Advance Micro Devices located in Beaverton, Oreg. In both cases, a total of two, 8 megabyte ICs may be used.

The printed circuit board assembly 56 may further include an. optional flash card memory 66 which is detachably connectable to the printed circuit board assembly 56 via the previously mentioned socket 54. The provision of such a socket 54 advantageously allows the system operator to expand the capacity of the flash memory 62, which in turn allows the intelligence module 56 to store a larger number of images. In the preferred embodiment, at least one 10 megabyte Model No. SDCFB-10 flash card memory manufactured by the San Disc Corporation located in Santa Clara, Calif. is used.

A communications transceiver 67 is included in the circuit board assembly 56 for enabling the network connections between the various modules 24, 26, 32, 36 via the previously mentioned 1394 FireWire cables 28, 33, and 37. Transceiver 67 is preferably a model TI transceiver manufactured by TI Incorporated located in Dallas, Tex.

A display driver 68 is also provided for generating and transmitting instructions to the LCD image display 39. The display driver 68 is normally part of the liquid crystal display module that forms the image on the display 39. Finally, the circuit board assembly 56 has an address data and input/output bus 72 for interconnecting all of the principal components 58, 62, 64, 66, 67, and 68 as is schematically illustrated.

Figure 5:
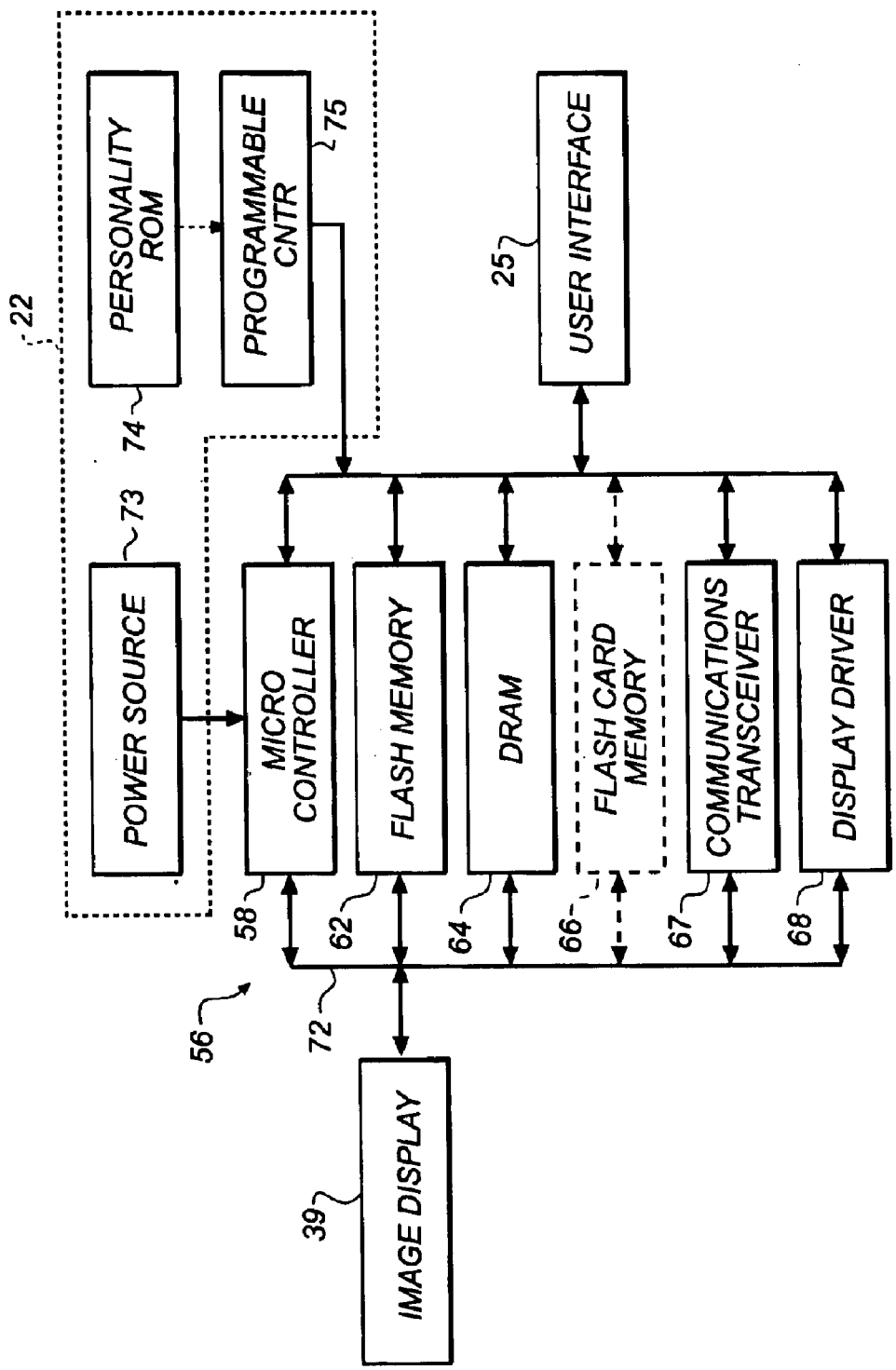
FIG. 5 is a schematic view of the printed circuit board assembly of the intelligence module having a user interface, illustrating its interaction with the electronic components of an image component such as a digital camera.

In contrast to the circuit diagram set forth in FIG. 5, the intelligence modules 26, 32, 36 do not include the components 25, 39, 66, or 68, and hence are simpler and less expensive to manufacture than the module 24 having a user interface.

FIG. 5 also illustrates the interaction between the circuit board assembly 56 of an intelligence module 24, 26, 32, 36 and an imaging component such as the digital camera 22. All of the imaging components include a power source 73, a personality ROM 74 specific to each component that stores the software necessary to operate the particular component. The ROM software includes Java™ byte code (readable by the intelligence module's Java™ Virtual Machine) in each of the imaging components to allow the controlling module 24 to download and coordinate processing between all the various modules 26, 32, and 36. Each imaging component is also provided with a programmable controller 75 for providing operational commands to the mechanical system of the imaging components (such as a lens focusing assembly, a print head driver, etc.). The programmable controller 75 may be a low-cost 8-bit microcontroller manufactured by Motorola in accordance with known technology.

In operation, when an intelligence module such as the controlling module 24 is plugged into an imaging component such as a digital camera 22, the circuit board assembly 56 of the module 24 is immediately actuated by the power source 73 of the component 22. Next, the device-specific operating software of the component 22 is downloaded from the personality ROM 74 of the component into the flash memory 62 of the circuit board assembly 56. The Java™ VM software stored in the Flash memory 62 is capable of executing the Java™ application code received from the personality ROM 74. The previously described operating procedure applies whenever any of the intelligence modules is plugged into any of the imaging components. Additionally, when any intelligence module is plugged into one of the components of the system 20, it utilizes Jini™ software included in flash memory 62 to communicate with the controlling intelligence module 24, thereby allowing module 24 to control and coordinate all of the imaging components of the system 20, and allowing the system operator to conduct such coordination and control via the user interface 25 and image display 39 on module 24.

Figure 6:
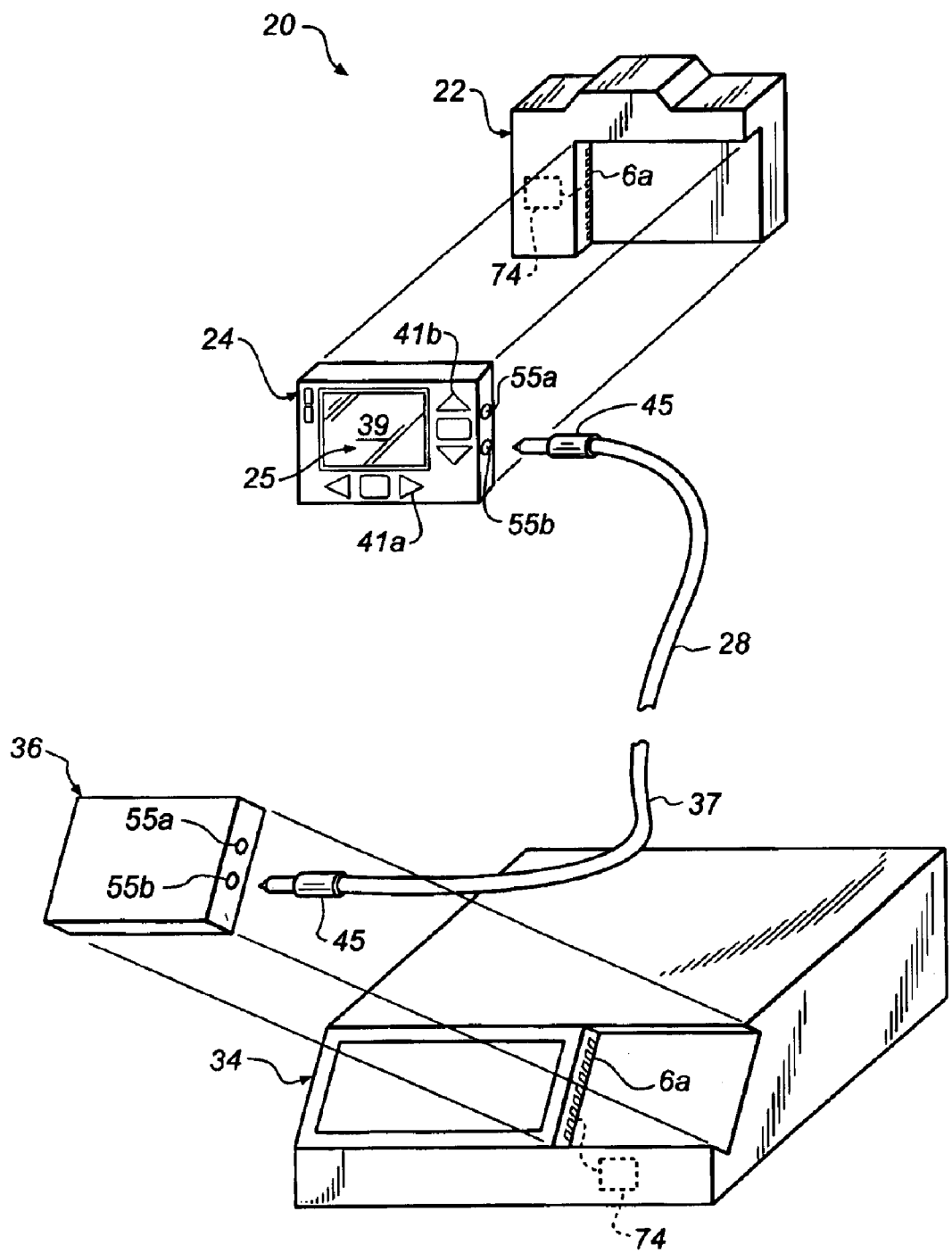
FIG. 6 is an isometric view of the first and last components of the imaging system of FIG. 3, illustrating how the individual components of the system are individually interconnected.

The interconnection of a plurality of intelligence modules 24,26,32,36 via a high band-width data conducting cable 28,33,37 as shown in FIG. 6, allows the controlling module 24 to network the efforts of all of the microcontrollers 58 of the other modules 26,32,36 to greatly enhance the resulting speed of the desired image processing. This is a significant advantage, since the processing of sampled digital images, especially relatively high resolution color images, requires a great deal of computational capability and large memory resources. An example of how the computational resources of the computer network 20 formed by the interconnection of the modules 24,26,32,36 will now be explained with reference in particular to FIGS. 3 and 6.

Let us assume that the controlling module 24 is first installed into the digital camera 22 so that the user may capture selected images into the memory of the camera 22. Upon the installation of the module 24, the operating instructions for the digital camera 22 are downloaded into the circuit board assembly 56 of the module 24 from the personality ROM 74. The microcontroller 58 of the controlling module 24 is thus able to perform all of the operational functions for the camera 22, and images are captured and stored in the image data DRAM memory of the intelligence module 56, and transferred into the Flash memory 62 of the module 24. After the desired number of images has been captured, the controlling module 24 is connected to the network 20 formed by the scanner 27, archiver 30, and printer 34 in combination with their respective intelligence modules 26,32,36. Let us suppose, for the purposes of simplicity, that the user of the network 20 only wishes to print images off of the printer 34 from data uploaded from the intelligence module 24. The conversion of the data from the charged couple device (CCD) of the digital camera 22 into a subjectively pleasing hard copy of a color image may require the following seven image processing steps:

1. Interpolate CCD CFA pixel data to con-tone image data, functionally: $CFA(I, P_{CFA})$
2. Sharpen, functionally: $SHRP(I, P_{SHRP})$
3. Horizontal resize, functionally: $HR(I, P_{HR})$
4. Vertical resize, functionally: $VR(I, P_{VR})$
5. Rotate, functionally: $ROT(I, P_{ROT})$
6. Color convert, functionally: $CC(I, P_{CC})$
7. Tone-scale adjust, functionally: $TSA(I, P_{TSA})$ where the first parameter I represents the input digital image, and the second parameter $P_x$ represents the control parameter for the respective image processing function. The explicit result of a given function is a copy of the image with the functional transform applied.

Using this functional notation, the 7-step image processing chain could easily be described as a composite function:

$$Put(Printer, TSA(CC(ROT(VR(HR(SHRP(CFA(Get(Cam), P_{CFA}), P_{SHRP}), P_{HR}), P_{VR}), P_{ROT}), P_{CC}), P_{TSA})))$$

where the operator Get(Cam) explicitly returns an image of a canonical format from the image source device "Cam" which is the digital camera 22, and the function Put(Printer, ...) wherein the first parameter Printer specifies a particular output device, in this case printer 34, and the second parameter is an image, in this case the output of the seven-step image processing chain.

A common interpretation of this composite function assumes that the image is completely processed by one function, and the result is then passed along as input to the next in the sequence. This is known as sequential processing:

Sequential processing architectures do not lend themselves to parallel processing, and also require large amounts of memory resources. Therefore a "pipelined" architecture is used in the preferred embodiment 20. In a pipelined architecture the source input image is subdivided into tiles, or bands, and each subdivision of the image is sent, in sequence through the imaging chain. The Put( . . . ) operator in this case will be executed repeatedly until all bands (or tiles) of the image has been processed. In this distributed architecture, the intelligence module 24 with the user interface 25 also coordinates the construction of an image processing pipeline that accommodates the work flow action selected by the operator. In doing so, the list of image processing operations are determined (along with the various operation and device dependent parametric information required by each function), the order of execution is established, and the operations are bound together into a chain. The individual functions comprising the chain are then farmed out among the microcontrollers 58 of the other modules 26,32,36 on the network 20, and executed.

The performance gain in this preferred embodiment 20 is due to the pipelined architecture where, in this case, different parts of the image are being processed simultaneously by four different processors 58 contained in the modules 24, 26, 32, 36. This preferred embodiment 20 also relies on a very fast networking technology, such as the IEEE 1394 (FireWire) that forms the cable segments 28, 33, 37 to move the image data quickly among the networked intelligence modules.

Figure 7:
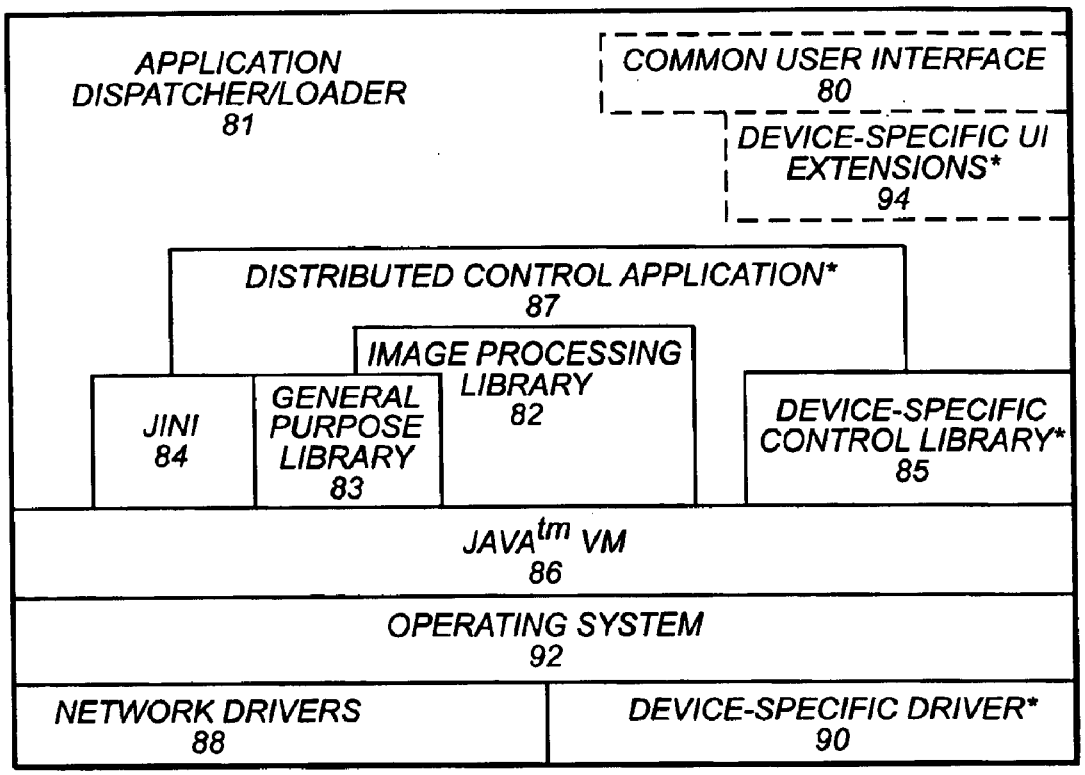
FIGS. 7 and 8 are software architecture diagrams of the software stored in the flash memory of a controlling module, a user interface, and a noncontrolling module, respectively.

FIG. 7 illustrates the architecture of the software layers in the controlling intelligence module 24. All of the software layers shown, with the exception of the device-specific user interface extensions 94, distributed control application 87, device-specific control library 85, and device-specific driver 90, are stored within the flash memory 62. The initialization sequence executed during power-up will pass control of the intelligence module 24 to the application dispatcher/loader layer 81 which controls all further action by the intelligence module.

Figure 9:
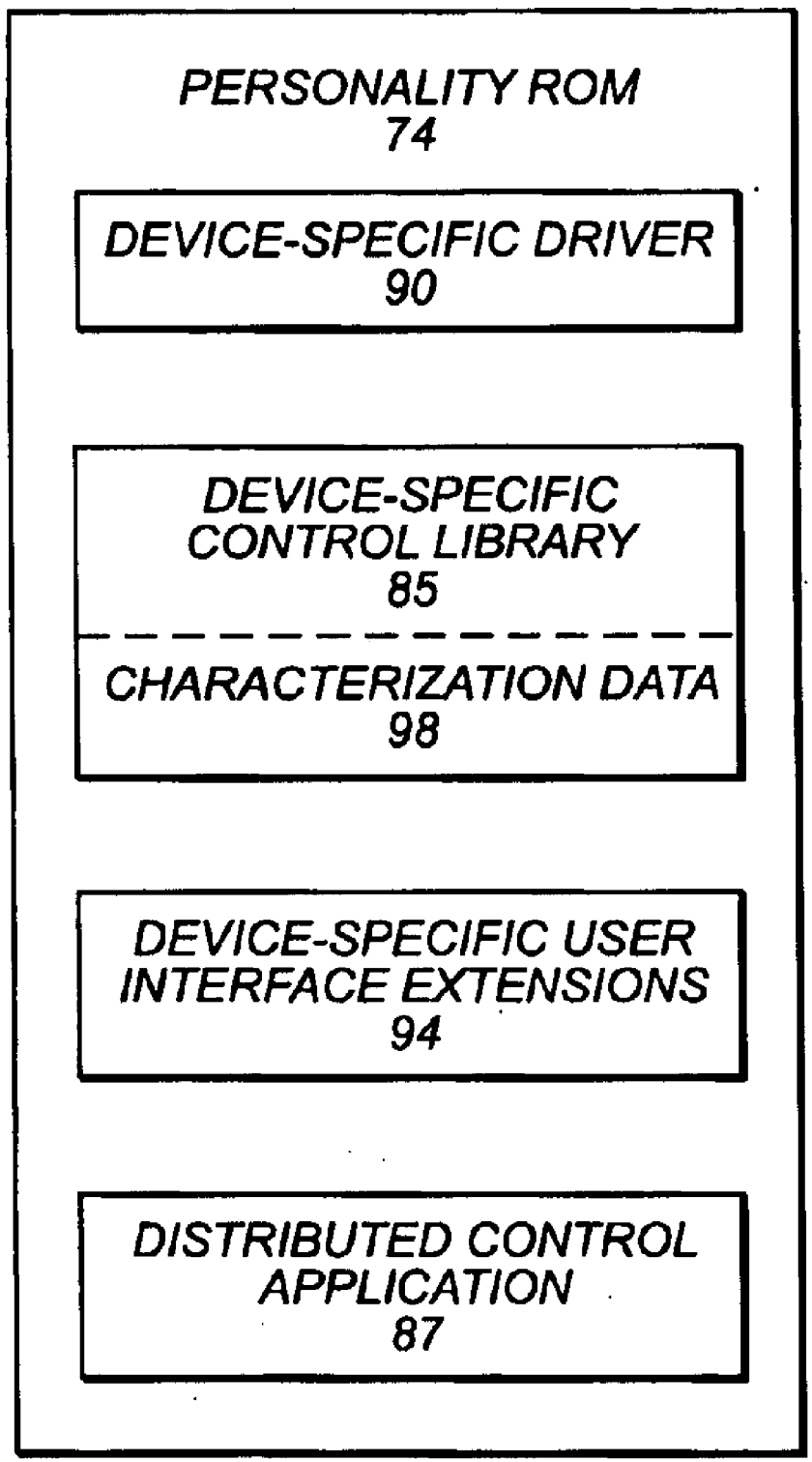
FIG. 9 is a software architecture diagram of the Java™ coded software stored with the personality ROM of the imaging component.

The device-specific software required to control each hardware device is contained in each device's personality ROM 74 as illustrated in FIG. 9. The first function of the application dispatcher/loader layer 81 of the software in the intelligence module 24 is to fill its device-specific driver layer 90 with the device-specific driver 90 from the personality ROM 74 in the device to which it is attached. This layer 90 resides in the DRAM 64 of the controlling intelligence module 24. This process is repeated, loading the device-specific control library 85 and the characterization data 98 from the same personality ROM 74 into the device-specific control library 85. Once loaded, the content of these layers will not change unless the intelligence module is disconnected from the device and reconnected to a different device. In the example schematically illustrated in FIG. 3, the software contained in layers 90 and 85 would be loaded from the camera 22, scanner 27, archiver 30, or printer 34 of the system 20 depending which device was attached to the intelligence module 24.

The application dispatcher/loader layer 81 must then load the device-specific user interface extensions software 94, from the personality ROM 74 of the device currently selected for control by the intelligence module 24, into its device-specific user interface extensions layer 94. This process is repeated, loading the distributed control application 87 from the same personality ROM 74 into the distributed control application layer 87. Because the intelligence module may select and control the device to which it is attached or may select and control a different device attached via the network, the content of these layers is dynamic. When the device selection is changed, the application dispatcher/loader 81 must reload these layers with software obtained from the appropriate personality ROM 74, either locally attached or over the network as appropriate. In the example schematically illustrated in FIG. 3, the software contained in layers 94 and 87 would be loaded as needed from the camera 22, scanner 27, archiver 30, or printer 34 of the system 20 depending which device was currently being controlled through the user interface 25.

Flash memory 62 also contains an image processing library 82. This layer 82 of software includes all of the image processing algorithms necessary to implement the seven image processing steps previously described in detail herein.

A general purpose library 82 of software is also included within the flash memory 62. This library 83 of software includes all of the computational algorithms necessary to implement the image processing algorithms stored in the image processing library 82 as well as utility functions to support the distributed control application 87.

Central to the software architecture stored within the flash memory 62 is a layer of Jini™ layer 84 is a layer of Java™ Virtual Machine software 85. This software 86 executes Java™ byte code passed to it from the software components 81, 32, 83, 34, 85, and 87 to support the processing required in the module 24.

Located below the Java™ layer 86 of the module 24 are layers of operating system software 92, network drivers software 88, and device driver software 90. The operating system software 92 provides a functionally hardware-independent software interface to the next layers of software that are platform dependent in terms of the brand and type of microcontroller used in the intelligence module 24 (e.g., Motorola microcontroller, Intel microcontroller, etc.). The device driver software layer 90 provides a software interface to the specific hardware devices comprising the hardware platform that are controlled and managed by the operating system software 92. The network drivers software 88 controls and manages the networking interface hardware to implement the network operating protocol used in the previously described IEEE 1394 FireWire cables 28, 33, and 37. These layers are typical of any embedded operating system or real time operating system.

In addition to its previously mentioned responsibility of loading the correct versions of the device-specific layers 94, 87, 85, and 90, the application dispatcher/loader software layer 81 also receives commands through the user interface 25 and/or through the network from other connected intelligence modules. After receiving these high-level commands, this layer 81 then dispatches one or more low-level commands through the distributed control application software 87 to control the operation of the intelligence module 24. These commands may be executed locally or may be sent over the network to be executed by remotely connected intelligence modules. This allows all interconnected intelligence modules to cooperate in controlling the devices to which they are attached and to share the processing load efficiently among them.

Figure 8:
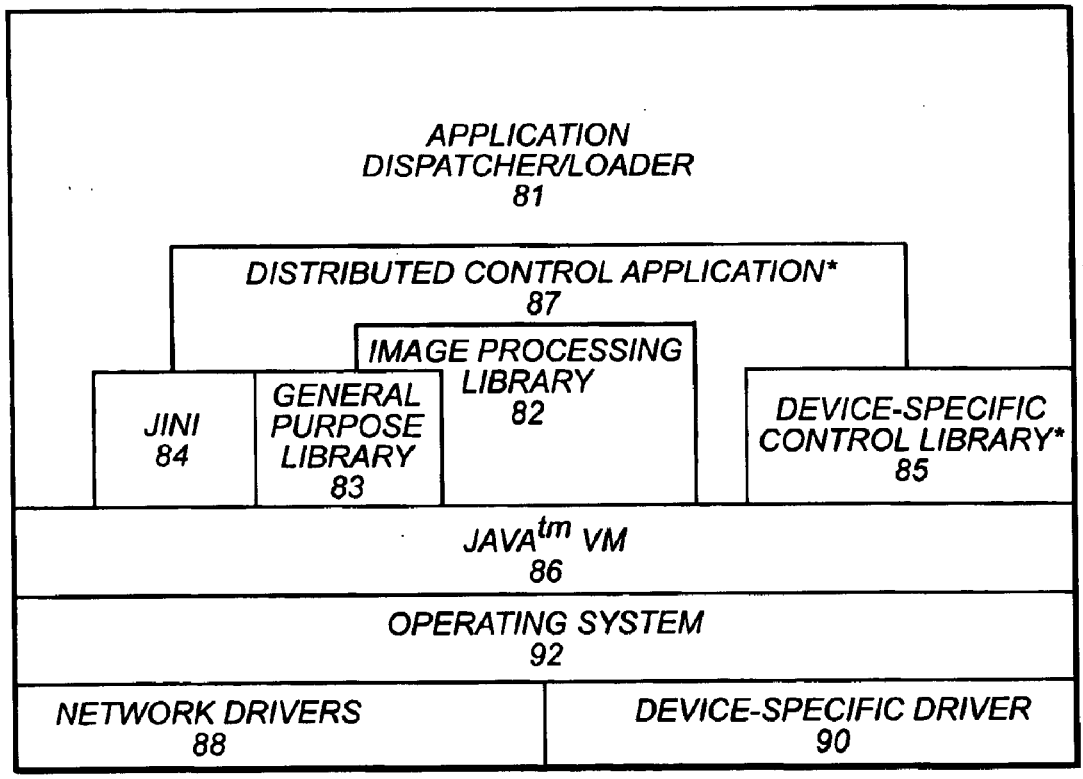

As is indicated in FIG. 8, the non-user interface intelligence modules 26, 32, and 36 include all of the software layers included with the user interface intelligence modules with the exception of the common user interface 80 and device-specific UI extensions 94. Because the user interface 25, the image display 39, and the display driver 68 are not present, these software layers are not needed. In this case, commands are received by the application dispatcher/loader software layer 81 of the non-user interface intelligence module only via the network and then processed in the same manner previously described. Only a user-interface intelligence module is capable of initiating a command sequence through its user interface. Other non-user interface intelligence modules may then be requested via the network to help carry the commands out. This means that there must be at least one user interface intelligence module present. If there is more than one user interface intelligence module only one of them can be in control at any one time.

With reference now to FIG. 9, each personality ROM 74 of each of the various components includes a layer of device-specific user interface extension software 94. This particular layer of software 94 provides the controlling module 24 with the software necessary for its user interface (i.e., the components 25, 39, 68, and 80) to operate the particular imaging component that the ROM 74 is mounted within. For example, if the imaging component is the digital camera 22 of the system 20 shown in FIG. 3, then layer 94 would include the software necessary for the user interface 25 of the controlling module 24 through the common user interface software 80 to execute the necessary image capturing function, scrolling function, image display function, image transfer function, etc. which are specific to a digital camera. Similarly, if the particular imaging component were printer 34, then the software layer 94 would include instructions necessary for the user interface 25 of the controlling module 24 through the common user interface software 80 to browse and select an image or images for printing, to specify printing options such as image orientation and number of copies, and to initiate print commands.

Each personality ROM 74 also includes a layer of device-specific driver software 90. This particular layer of software is used by the microcontroller 58 of the control module 24 to operate the particular imaging component that the personality ROM 74 forms a part of. For example, if the imaging component is a camera 22, then software layer 90 would include device-specific control software for adjusting the aperture of the camera 22 to an optimum size prior to and during image capturing, controlling the capturing process, and providing a software interface for the intelligence module to access the raw image data resulting from the scene exposure of the camera's CCD. Finally, each personality ROM 74 includes characterization data 98. This data describes characteristics of the connected hardware device which are needed by the device-specific control library software 85 as to what image processing is required in order to process image data originating from the imaging component, as well as the device dependent parametric information required by the image processing operations for proper image conversion. Examples of such image processing parameters include the number of pixels that the device operates in (which may be quite different between digital camera 22 and printer 34), and the particular color format that the image is stored within (which is typically red-green-blue for a digital camera 22, but cyan-magenta-yellow for an imaging component such as printer 34). Characterization data 98 allows the microcontroller 58 of the controlling module 24 to readily construct an image processing chain to convert image data received from one component into properly formatted and processed image data which may be readily consumed and processed by another component.

The invention has been described in detail with particular reference to certain preferred embodiments thereof, but it will be understood that variations and modifications can be effected within the spirit and scope of the invention.

PARTS LIST

1. Imaging system
2. Digital camera
4. Intelligence module
6. Connector socket
7. User interface
8. Archiver
10. APS film scanner
12. Printer
14. Imaging system
15. Edit/view station
16. Archiver
18. Printer
20. Imaging system of the invention
22. Digital camera
24. Intelligence module
25. User interface
26. Intelligence module
27. APS film scanner
28. Cable segment
30. Archiver
32. Intelligence module
33. Cable segment
34. Printer
36. Intelligence module
37. Cable segment
39. LCD screen
40. Image display
41. Control buttons a,b
43. Input and Output jack sockets a,b
45. Jack connector
47. LED display
50. LCD screen
52. Backlight panel
54. Flash card socket
56. Printed circuit board array
58. Microcontroller
62. Flash memory
64. DRAM
66. Flash card memory
67. Communications transceiver
68. Display driver
72. Address data input/output bus
73. Power source
74. Personality ROM
75. Programmable controller
80. Common user interface software
81. Distributed application software
82. Image processing library
83. General purpose library
84. Jini™ system coordination software
85. Device-specific control library
86. Java™ virtual machine software
87. Distributed control application software
88. Network drivers software
90. Device-specific driver software
92. Operating system software
94. Device-specific user interface extensions
98. Characterization data

What is claimed is:

1. A method of operating an electronic imaging system as a distributed processor network, wherein said system includes a plurality of imaging components of different functionality wherein at least one of the imaging components is a digital camera and another of the imaging components is a printer, each of the imaging components being connected to its own respective intelligence module having a respective microcontroller and respective memory, the respective memory having operating instructions that is device dependent for the respective imaging component, the method comprising the steps of:

interconnecting the intelligence modules of said components with a data interface to form a system network; and subdividing an image captured by the digital camera and transmitting different parts of said image over the system network so that parallel processing of different parts of said image is performed simultaneously by the different imaging components including parallel processing of the image by the digital camera and the printer.

2. The method of operating an electronic imaging system as defined in claim 1, wherein said different groups of said image data correspond to different portions of an image.

3. The method of operating an electronic imaging system as defined in claim 1, wherein said system network includes software for executing a chain of sequential image processing steps sequentially within each of the intelligence modules of the system, and further including the step of sequentially processing different groups of said image data through said intelligence modules substantially simultaneously.

4. The method of operating an electronic imaging system as defined in claim 1, wherein one of said modules has a user interface, and wherein said network is controlled by said module having said user interface.

5. The method of operating an electronic imaging system as defined in claim 4, wherein each of said imaging components includes a respective memory circuit that stores operating instructions for its respective component, and said respective intelligence module has software for downloading and executing said operating instructions, and further comprising the step of downloading said operating instructions from each of said respective memory circuits into said respective intelligence module prior to processing said image data.

6. The method of operating an electronic imaging system as defined in claim 3, wherein said downloading software in said intelligence module includes Java™ software.

7. The method of operating an electronic imaging system as defined in claim 3, wherein said downloading software in said intelligence module includes Jini™ software.

8. The method of operating an electronic imaging system as defined in claim 3, wherein said downloading software in said intelligence module includes networking software.

9. An electronic imaging system operating as a distributed processor network, said system comprising:

a plurality of imaging components of different functionality wherein at least one of the imaging components is a digital camera and another of the imaging components is a printer, each of the imaging components being connected to its own respective intelligence module having a respective microcontroller and respective memory, the respective memory having operating instructions that is device dependent for the respective imaging component;

a connection interconnecting the intelligence modules of said components with a data interface to form a distributed system network;

the intelligence modules being programmed so that image processing steps are performed simultaneously on respective different portions of data groups of an image by different ones of said intelligence modules; and a microcontroller of one of the imaging components being operative to distribute different portions of the data groups of the image to the different ones of said intelligence modules so that parallel processing of the image may be made by the imaging components including the camera and printer.

10. The electronic imaging system as defined in claim 9, wherein said data groups are substantially equal in size, and wherein each data group corresponds to a portion of a image.

11. The electronic imaging system as defined in claim 9, wherein each data group is sequentially entered through said intelligence modules such that said image processing steps are carried out in the same order for each data group.

12. The electronic imaging system as defined in claim 9, wherein one of said modules has a user interface, and wherein said network is controlled by said module having said user interface.

13. The electronic imaging system as defined in claim 12, wherein each of said imaging components includes a memory circuit that stores operating instructions for its respective component, and said intelligence module has software for downloading and executing said operating instructions.

14. The electronic imaging system as defined in claim 13, wherein said downloading software in said intelligence module includes Java software.

15. The electronic imaging system as defined in claim 13, wherein said downloading software in said intelligence module includes networking software.

16. The electronic imaging system as defined in claim 13, wherein said operating instructions stored in each of said memory circuits include user interface software for its respective imaging component.

17. The electronic imaging system as defined in claim 13, wherein said operating instructions stored in each of said memory circuits include component specific firmware for its respective imaging component.

18. The electronic imaging system as defined in claim 13, wherein said operating instructions stored in each of said memory circuits include characterization data for its respective imaging component for allowing the intelligence module connected to said imaging component to convert image data received from another imaging component to properly format and process image data.

* * * * *